(12) United States Patent
Mathieu et al.

(10) Patent No.: US 9,443,429 B2
(45) Date of Patent: Sep. 13, 2016

(54) OPTIMUM GAZE LOCATION ON FULL WINDSCREEN DISPLAY

(75) Inventors: Roy J. Mathieu, Rochester Hills, MI (US); Thomas A. Seder, Northville, MI (US); Joseph F. Szczerba, Grand Blanc, MI (US); Dehua Cui, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 158 days.

(21) Appl. No.: 13/356,695

(22) Filed: Jan. 24, 2012

(65) Prior Publication Data

US 2013/0188258 A1    Jul. 25, 2013

(51) Int. Cl.
| | |
|---|---|
| G02B 27/14 | (2006.01) |
| G09G 5/00 | (2006.01) |
| H04N 7/00 | (2011.01) |
| G03B 21/26 | (2006.01) |
| G05D 1/00 | (2006.01) |
| G01C 21/00 | (2006.01) |
| G08G 1/16 | (2006.01) |
| G02B 27/01 | (2006.01) |
| G09G 3/00 | (2006.01) |

(52) U.S. Cl.
CPC .............. *G08G 1/165* (2013.01); *G08G 1/166* (2013.01); *G08G 1/167* (2013.01); *G02B 2027/014* (2013.01); *G02B 2027/0141* (2013.01); *G09G 3/003* (2013.01); *G09G 2380/10* (2013.01)

(58) Field of Classification Search
CPC .......... G02B 27/0172; G02B 27/0101; G02B 2027/0178; G02B 2027/0132; G02B 2027/011; G02B 27/01

USPC ................ 359/409–410, 462, 466, 638–639, 359/13–14, 603–636, 404, 407; 345/7, 9, 345/156; 348/115; 353/11–12, 28, 119; 349/11; 701/1; 310/49 R, 156.32, 310/156.33, 156.34, 156.35, 266–268, 310/156.02; 340/438, 980, 995.1, 815.47, 340/815.74

See application file for complete search history.

(56) References Cited

U.S. PATENT DOCUMENTS

| | | | | |
|---|---|---|---|---|
| 6,141,619 | A | * | 10/2000 | Sekine ............................ 701/93 |
| 6,986,581 | B2 | | 1/2006 | Sun et al. |
| 7,043,342 | B1 | * | 5/2006 | Dewees ............................ 701/1 |
| 7,090,355 | B2 | | 8/2006 | Liu et al. |
| 7,182,467 | B2 | | 2/2007 | Liu et al. |

(Continued)

FOREIGN PATENT DOCUMENTS

| | | |
|---|---|---|
| DE | 102006054323 A1 | 5/2008 |
| DE | 102009027026 A1 | 12/2010 |

(Continued)

OTHER PUBLICATIONS

U.S. Appl. No. 12/900,566, Szczerba et al.

(Continued)

*Primary Examiner* — Dawayne A Pinkney

(57) ABSTRACT

A method to display a registered graphic upon a substantially transparent windscreen head-up display within a source vehicle includes monitoring an operating environment of the source vehicle, monitoring a driver registration input, determining a recommended continuous gaze location based upon the operating environment and the driver registration input, and displaying the registered graphic upon the substantially transparent windscreen head-up display.

8 Claims, 3 Drawing Sheets

(56) References Cited

U.S. PATENT DOCUMENTS

| | | | |
|---|---|---|---|
| 7,199,767 B2* | 4/2007 | Spero | 345/7 |
| 7,213,923 B2 | 5/2007 | Liu et al. | |
| 7,460,951 B2 | 12/2008 | Altan et al. | |
| 8,098,170 B1 | 1/2012 | Szczerba et al. | |
| 8,098,171 B1 | 1/2012 | Szczerba et al. | |
| 2005/0154505 A1* | 7/2005 | Nakamura et al. | 701/1 |
| 2006/0022808 A1* | 2/2006 | Ito | G08G 1/167 340/425.5 |
| 2006/0100774 A1* | 5/2006 | Barkowski et al. | 701/200 |
| 2008/0158096 A1* | 7/2008 | Breed | 345/7 |
| 2008/0158510 A1 | 7/2008 | Tant et al. | |
| 2009/0268946 A1 | 10/2009 | Zhang et al. | |
| 2010/0253489 A1 | 10/2010 | Cui et al. | |
| 2010/0253492 A1 | 10/2010 | Seder et al. | |
| 2010/0253493 A1 | 10/2010 | Szczerba et al. | |
| 2010/0253526 A1 | 10/2010 | Szczerba et al. | |
| 2010/0253539 A1 | 10/2010 | Seder et al. | |
| 2010/0253540 A1 | 10/2010 | Seder et al. | |
| 2010/0253541 A1 | 10/2010 | Seder et al. | |
| 2010/0253542 A1 | 10/2010 | Seder et al. | |
| 2010/0253543 A1 | 10/2010 | Szczerba et al. | |
| 2010/0253593 A1 | 10/2010 | Seder et al. | |
| 2010/0253594 A1 | 10/2010 | Szczerba et al. | |
| 2010/0253595 A1 | 10/2010 | Szczerba et al. | |
| 2010/0253596 A1 | 10/2010 | Szczerba et al. | |
| 2010/0253597 A1 | 10/2010 | Seder et al. | |
| 2010/0253598 A1 | 10/2010 | Szczerba et al. | |
| 2010/0253599 A1 | 10/2010 | Szczerba et al. | |
| 2010/0253600 A1 | 10/2010 | Seder et al. | |
| 2010/0253601 A1 | 10/2010 | Seder et al. | |
| 2010/0253602 A1 | 10/2010 | Szczerba et al. | |
| 2010/0253688 A1 | 10/2010 | Cui et al. | |
| 2010/0253918 A1 | 10/2010 | Seder et al. | |
| 2010/0254019 A1 | 10/2010 | Cui et al. | |
| 2010/0289632 A1 | 11/2010 | Seder et al. | |
| 2010/0292886 A1 | 11/2010 | Szczerba et al. | |
| 2012/0089273 A1 | 4/2012 | Seder et al. | |
| 2012/0093357 A1 | 4/2012 | Seder et al. | |
| 2012/0169513 A1 | 7/2012 | Szczerba et al. | |
| 2012/0169572 A1 | 7/2012 | Seder et al. | |
| 2012/0169861 A1 | 7/2012 | Szczerba et al. | |
| 2012/0173067 A1 | 7/2012 | Szczerba et al. | |
| 2012/0173069 A1 | 7/2012 | Tsimhoni et al. | |
| 2012/0174004 A1 | 7/2012 | Seder et al. | |
| 2013/0076787 A1 | 3/2013 | Mathieu et al. | |
| 2013/0141250 A1 | 6/2013 | Mathieu et al. | |
| 2013/0142385 A1 | 6/2013 | Mathieu et al. | |
| 2013/0144521 A1 | 6/2013 | Mathieu et al. | |

FOREIGN PATENT DOCUMENTS

| | | |
|---|---|---|
| DE | 102010010442 A1 | 8/2011 |
| DE | 102010001684 A1 | 11/2011 |
| EP | 2329974 A1 | 6/2011 |

OTHER PUBLICATIONS

U.S. Appl. No. 12/903,267, Seder et al.
U.S. Appl. No. 12/980,503, Szczerba et al.
U.S. Appl. No. 12/979,432, Szczerba et al.
U.S. Appl. No. 12/900,539, Seder et al.
U.S. Appl. No. 12/980,522, Seder et al.
U.S. Appl. No. 12/980,612, Szczerba et al.
U.S. Appl. No. 12/981,206, Tsimhoni et al.
U.S. Appl. No. 12/981,602, Szczerba et al.
U.S. Appl. No. 12/982,478, Seder et al.
U.S. Appl. No. 13/239,667, Mathieu et al.
U.S. Appl. No. 13/312,045, Mathieu et al.
U.S. Appl. No. 13/309,691, Mathieu et al.
U.S. Appl. No. 13/309,716, Mathieu et al.

* cited by examiner

OPTIMUM GAZE LOCATION ON FULL WINDSCREEN DISPLAY

TECHNICAL FIELD

This disclosure is related to graphical imaging upon a windscreen in a motor vehicle.

BACKGROUND

The statements in this section merely provide background information related to the present disclosure and may not constitute prior art.

Presentation of information to the operator of a vehicle in an effective manner is desirable and reduces strain upon the operator. Display techniques are known wherein light is projected upon a screen, and the light is converted into a viewable display upon the screen. Applied to transportation applications, such displays are known as head-up displays, wherein information is projected upon a visor, a screen between the operator and a windscreen, or directly upon the windscreen. However, known systems projecting light directly upon a windscreen frequently require a coating or material that significantly decreases the transparency of the windscreen. As a result, head-up displays are frequently restricted to limited region upon the windscreen.

Vehicle systems monitor a great deal of information. Devices are known that monitor operation of the vehicle and/or details of an operating environment in which the vehicle is traveling. Additionally, information is available from a variety of sources to locate the vehicle in relation to a three-dimensional (3D) map database, plan a travel route for the vehicle to a destination, and correlate this travel route to available information regarding the route. Additionally, on-board vehicle systems provide a wide variety of information that can be used to improve control of the vehicle. Additionally, vehicle to vehicle communications are known to utilize data collected in one vehicle in communicating with vehicles elsewhere on the road.

Gaze location is important to professional race drivers. Methods are known to train drivers to look at a specific location in a view through a windshield in order to most effectively control the vehicle.

SUMMARY

A method to display a registered graphic upon a substantially transparent windscreen head-up display within a source vehicle includes monitoring an operating environment of the source vehicle, monitoring a driver registration input, determining a recommended continuous gaze location based upon the operating environment and the driver registration input, and displaying the registered graphic upon the substantially transparent windscreen head-up display.

BRIEF DESCRIPTION OF THE DRAWINGS

One or more embodiments will now be described, by way of example, with reference to the accompanying drawings, in which.

DETAILED DESCRIPTION

Figure 1:
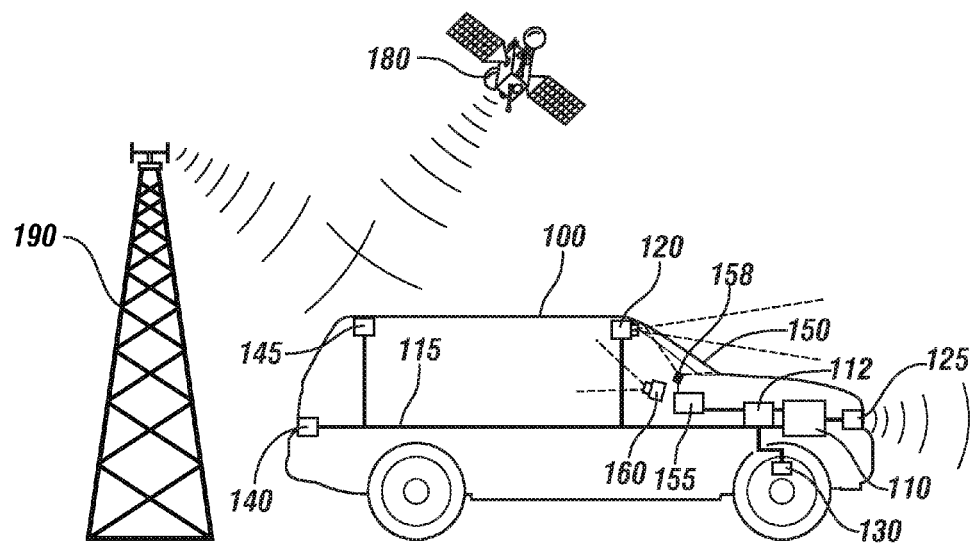
FIG. 1 illustrates an exemplary vehicle equipped with an enhanced vision system, in accordance with the present disclosure.

Referring now to the drawings, wherein the showings are for the purpose of illustrating certain exemplary embodiments only and not for the purpose of limiting the same, FIG. 1 illustrates an exemplary vehicle (source vehicle) equipped with an enhanced vision system (EVS). An exemplary EVS is disclosed in commonly assigned and co-pending U.S. application Ser. No. 12/417,077, which is incorporated herein by reference. Source vehicle 100 includes an EVS system manager 110; vehicle sensor systems, including camera system 120 and radar system 125; vehicle operation sensors, including vehicle speed sensor 130; information systems, including global positioning device 140 and wireless communication system 145; head-up display (HUD) 150; EVS graphics system 155; graphics projection system 158; and occupant eye location sensing system 160. The EVS system manager can communicate directly with various systems and components, or the EVS system manager can alternatively or additionally communicate over a LAN/CAN system 115.

The source vehicle operates upon a roadway in the presence of traffic or other obstacles that need to be taken into account to maneuver the source vehicle. Details of an operating environment of the source vehicle can be monitored by a number of sensor devices and/or systems. Camera system 120 includes a camera or image capturing device taking periodic or sequential images representing a view from the source vehicle. Radar system 125 includes a device known in the art utilizing electromagnetic radiation to detect other vehicles (target vehicles) or objects located near the source vehicle. A number of known sensor devices are used within a vehicle to monitor vehicle speed, engine speed, wheel slip, and other parameters representative of the operation of the vehicle. Vehicle speed sensor 130 represents one such an in-vehicle sensor, but the scope of the disclosure includes any such sensors for use by the EVS. Global positioning device 140 and wireless communication system 145 communicate with resources outside of the source vehicle, for example, satellite system 180 and cellular communications tower 190. Global positioning device 140 may be utilized in conjunction with a 3D map database including detailed information relating to a global coordinate received by the global positioning device 140 regarding the current location of the source vehicle. In one embodiment, the location of the source vehicle is made more accurate by utilizing corresponding data from sensor devices, for example, camera images and analysis thereof, to improve the accuracy of the location of the source vehicle with respect to the 3D map database. In another embodiment, in a racing vehicle upon a race track, the global positioning device can be replaced with a device receiving highly accurate localizing data from race track infrastructure devices, giving the vehicle a precise location upon the race track. Information from the vehicle sensor systems and the vehicle operation sensors can be utilized by the EVS system manager 110 to monitor the current orientation of the source vehicle. The term source vehicle as used herein refers to a vehicle including the EVS and display systems as described herein. The term target vehicle as used herein refers to a vehicle external and independent from the source vehicle.

HUD 150 includes a windscreen equipped with features capable of displaying an image projected thereupon while remaining transparent or substantially transparent such that occupants of the source vehicle can clearly observe outside of the source vehicle through the windscreen. HUD 150 can include features capable of displaying an image on a portion of the windscreen or on a substantially entirety of the full windscreen. While HUD 150 includes the windscreen in the front of the source vehicle, other surfaces within the source vehicle can additionally or alternatively be used for projection, including side windows and a rear window. Additionally, the view on the front windscreen could be continued upon the front vehicle "A-pillars" and onto the side windows as a continuous image. EVS graphics engine 155 includes display software or programming translating requests to display information from the EVS system manager 110 in graphical representations of the information. The EVS graphics engine 155 includes programming to compensate for the curved and tilted surface of the windscreen and any other surfaces onto which graphics are to be projected. EVS graphics engine 155 controls graphics projection system 158 including a laser or projector device producing an excitation light to project the graphical representations.

A driver registration input is required to display a registered graphic upon the HUD150, with the graphic being located upon the HUD relative to the view of the driver and the context of objects or roadway details visible through the HUD. A driver registration input can include information about the location of the eyes and/or the head of the driver. Occupant eye location sensing system 160 includes sensors known in the art to approximate a location of the head of an occupant and further the orientation or gaze location of the eyes of the occupant. Based upon the output of the occupant eye location sensing system 160, the current location and orientation of the source vehicle 100, a user input location and a future navigation maneuver location, EVS system manager 110 can accurately dynamically register the graphical representations to the HUD 150 such that the occupant sees the images overlaid with features visible through the display.

The EVS and other control modules utilized for the methods disclosed herein can be physically located within a single unit or device or can be spanned across a number of physical devices. Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The EVS can determine a wide variety of graphics upon the HUD to aid the driver, presenting information helpful in controlling the vehicle. A method to immediately direct a gaze of an operator to newly detected objects or potential hazards sensed in an operating environment is disclosed in commonly assigned and co-pending application Ser. No. 12/563,400, which is incorporated herein by reference. Directing a gaze of an operator can be done in response to an immediate threat or input requiring immediate attention. In racing or professional driving, an operator can be trained to direct a continuous gaze to a location or feature in a view of the operator. A continuous gaze in a proper location permits the operator to maximize perception of important features of the roadway and utilize a maximum time to execute vehicle maneuvers in response to the important features. An improper continuous gaze location, for example, including a gaze located too closely to the front of the source vehicle being driven, a gaze fixed upon the horizon, or a gaze directed at scenery by the side of the road, can lead to abrupt control maneuvers.

Methods and practices to select or train a driver to use a proper continuous gaze location for race conditions and street driving conditions are known in the art and will not be described in detail here. A proper continuous gaze location can include viewing a point at least a minimum distance in front of the source vehicle and/or not too distant in front of the source vehicle. A proper continuous gaze location can include viewing a point within an acceptable left/right angle in front of the source vehicle, permitting the operator to perceive important information regarding the path being driven by the source vehicle. A continuous gaze location can be trained based upon visual tracking, directing the operator to look where the source vehicle should be driven. A continuous gaze location can be trained based upon a manual operation that the operator needs to perform, for example, executing a turn or avoiding an obstacle in the roadway. A driver can be trained to focus a gaze upon a feature or features upon the roadway in order to aid coordination of perception and control functions. Features such a lane marker at a selected distance in front of the source vehicle or a feature upon a target vehicle in traffic in front of the source vehicle can be selected. A fixed landmark at an opportune position in the view, for example, close to the path that the vehicle is expected to take, can be used to position the continuous gaze location. A driver can be trained to fixate on a continuous gaze location that indicates a required stopping point, such as a stop sign or a road feature illustrating where the vehicle must stop for a traffic light.

A vehicle can utilize a historical database of continuous gaze points to determine a location for a current continuous gaze location. According to one embodiment, a vehicle can download or otherwise reference historical gaze locations of the current driver or of other drivers in the database and analyze those gaze locations for helpful patterns indicating behavior of typical drivers in that location on the roadway. Such analysis of downloaded gaze locations can be useful in racing applications or in street driving conditions.

In racing applications, a proper continuous gaze location can take into account signs or indicators describing performance or instructions of the pit crew as part of the information that the driver is required to perceive. Similarly, in street driving conditions, a continuous gaze location can be trained that accounts for traffic control signs or signals or instructions painted upon the road. For specific maneuvers, such as passing another vehicle, a continuous gaze location can be used throughout the maneuver providing coordination in perceiving a location of a legal passing zone, the location of the vehicle being passed, and the presence of other vehicles in traffic that could interfere with the maneuver. In other maneuvers, a continuous gaze location can be trained to a point upon the roadway that indicates the next step in the maneuver that needs to be executed. For example, in a turn including a braking point where the vehicle must begin to slow and an apex of the turn wherein the vehicle can begin to accelerate can each serve as continuous gaze locations in advance of the vehicle reaching each point, assisting the driver in correctly timing the respective braking and acceleration maneuvers. Additionally, a turn in point corresponding to an entrance to a curve and a turn out point corresponding to an exit to the curve can be useful to locating a continuous gaze location. A continuous gaze location can be used to additionally assist in directing the driver toward a certain location or lateral position on the racetrack or roadway, for example, when a lane shift is imminent, a continuous gaze location can be fixed in the target lane. A number of embodiments of continuous gaze locations for a number of applications and maneuvers are envisioned, and the disclosure is not intended to be limited to the particular exemplary embodiments disclosed. In addition to a proper continuous gaze location, a driver can be instructed to coordinate perception and control to other inputs, such as the sound of tires contacting the inside berm of a racetrack or pavement distortions on the inside of a turn on a roadway.

A driver's aid can be projected upon a HUD including a recommended continuous gaze location. Based upon information regarding the roadway, such as a known location of the vehicle and a 3D map database or data from vehicle sensors such as a camera or radar device, and information about the eye location of the operator, a registered graphic including a recommended continuous gaze location can be projected upon the HUD.

A recommended continuous gaze location can be determined according to a number of embodiments. For example, an estimated future position of the vehicle can be determined and the recommended continuous gaze location can be determined based upon the estimated future position. According to one embodiment, an estimated future position of the vehicle can be determined based upon a current trajectory of the vehicle. Based upon vehicle speed and vehicle heading, a position of the vehicle some seconds in the future can be estimated. Also, information from a GPS device in combination with a 3D map database can be used to estimate a future position, for example, projected movement of the vehicle in a current lane of travel or along a planned route of travel. Alternatively, a planned vehicle maneuver can be input or predicted, and an estimated future position can be determined based upon the maneuver. For example, if a turn signal is activated, indicating a lane change or a turn onto another street, an estimated future position can be determined based upon the signal and local lane geometry. In another example, if another vehicle in front of the vehicle or a vehicle being passed is detected and a passing maneuver is input or predicted by a turn signal activation and/or movements of the operator's eyes and head indication an intention to pass, an estimated future position of the vehicle can be estimated based upon a typical passing maneuver in a passing lane. Additionally, vehicle sensor inputs can further determine whether the vehicle is in a legal passing zone and whether the passing zone is open to determine a likelihood that the passing maneuver is likely to begin. Other possible planned vehicle maneuvers can include use of an exit ramp from a highway, stops or accelerations due to traffic signals or traffic patterns, maneuvers due to construction barricades, and maneuvers to avoid a sensed obstacle or obstruction on the roadway.

A registered graphic illustrating a recommended continuous gaze location can be registered to a visible feature in the view of the operator. For example, a lane marker can be used as a gaze location, with the graphic registered to the view of the lane through the windscreen. Similarly, a crack in the pavement of the roadway can be used as feature to register the graphic. Other visible features that can be used to register the graphic include another vehicle in front of the vehicle, a sign, traffic instructions painted on the roadway, a tree, a traffic barrier along the side of the roadway, and a fence along the roadway. In the event that the vehicle needs to stop due to a traffic signal or traffic in front of the vehicle, the traffic signal or the traffic can be used to register the graphic. Alternatively, the graphic illustrating the recommended gaze location can be registered to a location within a lane of travel some distance in front of the vehicle, with the graphic itself acting as a substitute visible feature in the view of the operator in the absence of an object or a feature of the roadway for the view to observe.

A registered graphic can be registered according to a single input, a single feature, or a single maneuver. In the alternative, a number of factors or inputs can be simultaneously evaluated to determine a registered graphic to be projected. For example, inputs to the graphic can be evaluated for priority to the operator, and only the prioritized input can be used to determine the registered graphic. In another embodiment, a plurality of inputs can be monitored, and a location or feature at or proximate to a weighted center indicated by the inputs can be used as a location to register the graphic.

A registered graphic illustrating a recommended continuous gaze location can include a number of embodiments. The graphic can include a dot, a circle, a cross, a reticle, an outline to a feature the graphic is being registered to, or any other shape that conveys to an operator a location to look. An operator can configure the graphic, selecting shape, size color, or intensity. The operator can download graphic designs through a wireless communication network. The operator can create a graphic, for example, through an application that can be projected upon the HUD permitting operator input, for example, through a mouse and selector button input. The graphic can change to convey other information at the same time that it is providing a continuous gaze location. For example, when the vehicle is approaching a turn that includes a braking point, the graphic can be changed to include a graphic and/or textual message indicating when the driver should brake. Additionally or alternatively, attendant graphics can be projected upon the HUD in addition to the continuous gaze location conveying the additional information to the operator. A number of embodiments of graphics to be projected upon the HUD are envisioned, and the disclosure is not intended to be limited to the particular exemplary embodiments disclosed herein. The registered graphic of the recommended continuous gaze location can be smoothed over a period of time to ensure that the graphic does not dart around the display or cause unnecessary distraction for the operator.

A graphic illustrating a recommended continuous gaze location can be displayed persistently upon the HUD. In one embodiment, the graphic can be suspended during travel on a segment of road with no significant turns and/or no significant traffic upon the road and displayed again when a graphic illustrating a continuous gaze location is situationally appropriate. In the event the road geometry changes or some feature or object is detected on the roadway that requires action by the operator, the suspension can be lifted and the graphic can be projected. Whether the graphic is displayed persistently or only when situationally appropriate can be selected as an option by the operator. A threshold for displaying the graphic can be adjusted by the operator. In the event vehicle sensors detect an object or potential hazard not related to the continuous gaze location, such as a pedestrian approaching the roadway, the graphic illustrating the recommended continuous gaze location can be suspended in order to direct the full attention of the drive to the newly detected hazard with an immediate gaze location graphic.

Figure 2:
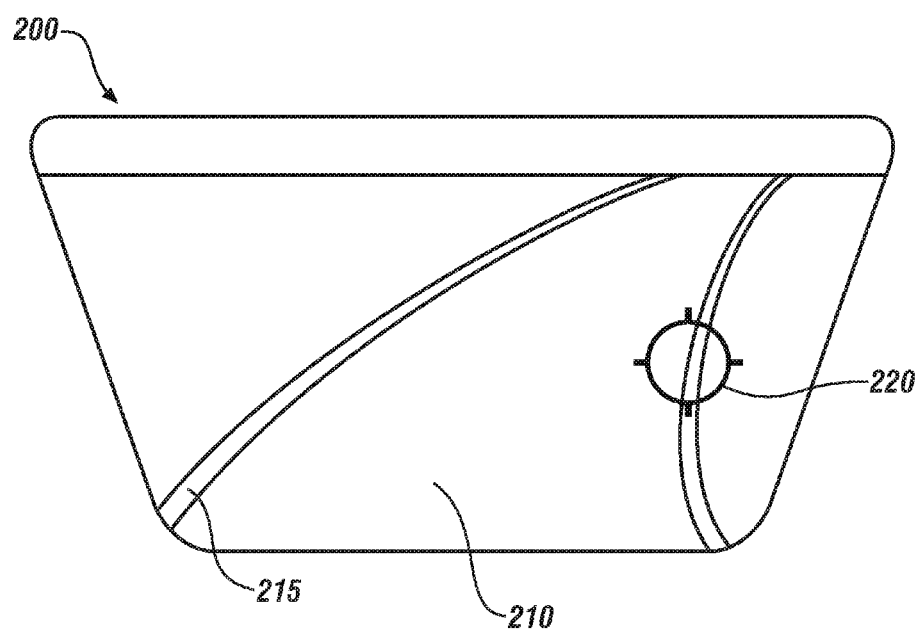
FIG. 2 illustrates an exemplary driving scene in a head-up display (HUD), including a continuous gaze location associated with a turn in the roadway, in accordance with the present disclosure.

FIG. 2 illustrates an exemplary driving scene in a HUD, including a continuous gaze location associated with a turn in the roadway. Scene 200 includes roadway 210 and lane markers 215 and 216. Roadway 210 is curving to the right in scene 200. Graphic 220 is illustrated, showing a recommended continuous gaze location for the operator, aiding the operator to focus upon the geometry of the inside of the turn some distance in front of the vehicle.

Figure 3:
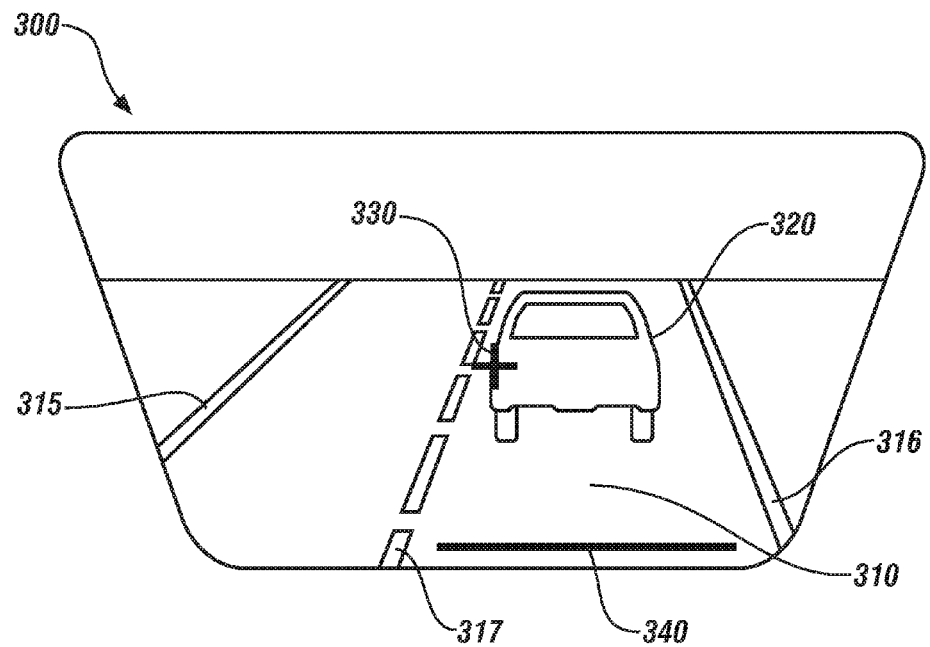
FIG. 3 illustrates an exemplary driving scene in a HUD, including a continuous gaze location associated with a passing maneuver, in accordance with the present disclosure.

FIG. 3 illustrates an exemplary driving scene in a HUD, including a continuous gaze location associated with a passing maneuver. Scene 300 includes roadway 310 and lane markers 315, 316, and 317. A vehicle 320 is illustrated upon roadway 310 in a current lane of travel. Graphic 330 is illustrated, showing a recommended continuous gaze location for the operator, aiding the operator in observing the location of vehicle 320 and the lane between lane markers 315 and 317 in which the passing maneuver can be executed.

Figure 4:
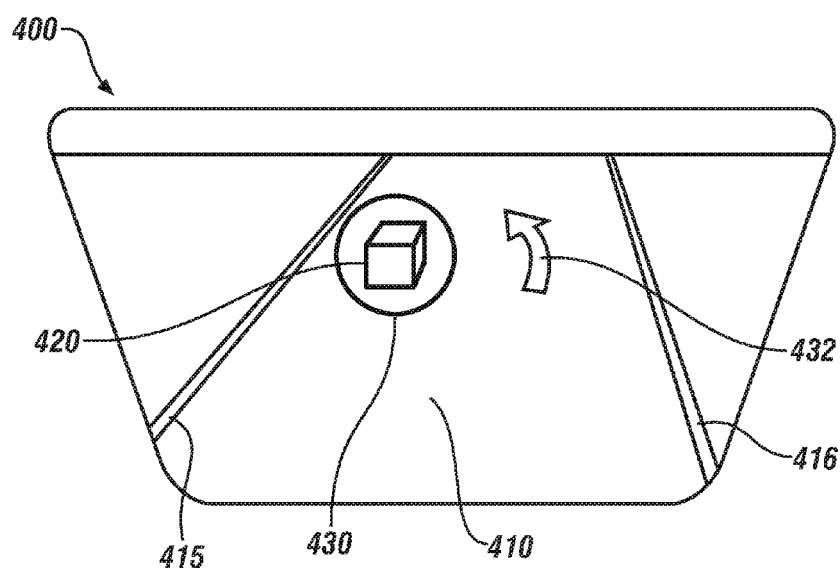
FIG. 4 illustrates an exemplary driving scene in a HUD, including a continuous gaze location associated with an object detected in the roadway, in accordance with the present disclosure.

FIG. 4 illustrates an exemplary driving scene in a HUD, including a continuous gaze location associated with an object detected in the roadway. Scene 400 includes roadway 410 and lane markers 415 and 416. A detected object 420 is illustrated upon roadway 410 in a current lane of travel. Graphic 430 is illustrated, showing an optional graphic that can be registered to the detected object to alert the operator. Additionally, graphic 432 is illustrated showing a recommended continuous gaze location for the operator while simultaneously conveying a recommended driving maneuver around the detected object 420. In an alternative example, if a determination was made that the object could not be safely bypassed, graphic 432 could convey a recommended maneuver to stop the vehicle.

Figure 5:
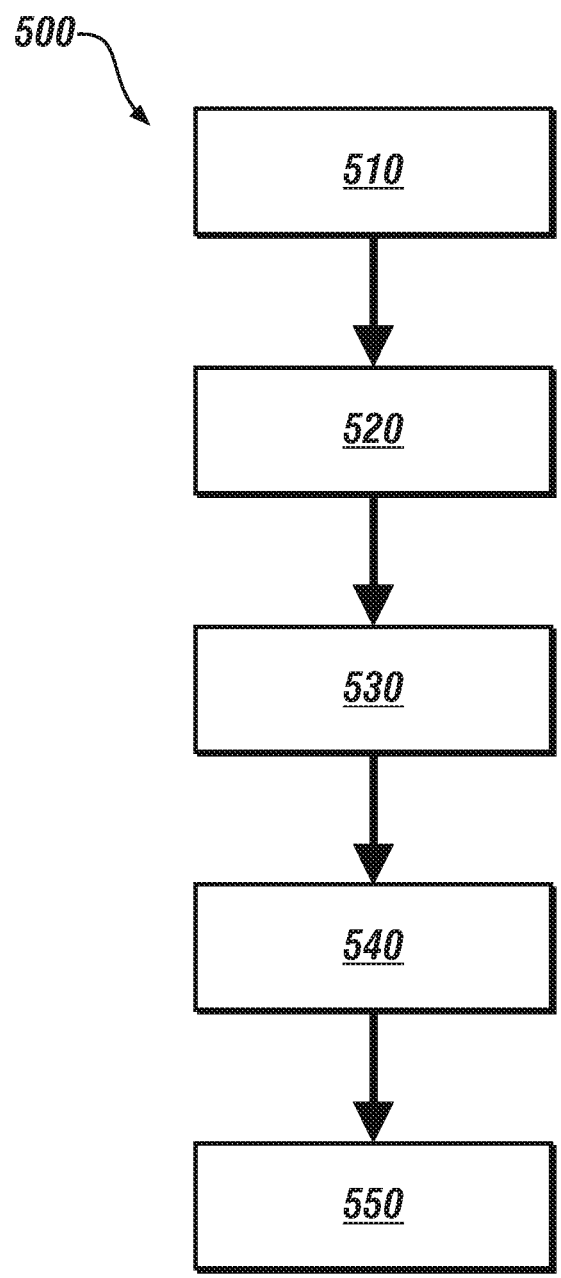
FIG. 5 illustrates an exemplary process to display a recommended continuous gaze location upon a display, in accordance with the present disclosure.

FIG. 5 illustrates an exemplary process to display a recommended continuous gaze location upon a display. Table 1 is provided as a key to FIG. 5 wherein the numerically labeled blocks and the corresponding functions are set forth as follows.

TABLE 1

| BLOCK | BLOCK CONTENTS |
| --- | --- |
| 510 | Monitor an Operating Environment for the Vehicle |
| 520 | Determine an Estimated Future Position of the Vehicle at Some Duration in the Future |
| 530 | Monitor a Driver Registration Input Indicating an Eye Location for the Operator |
| 540 | Determine a Registered Graphic Including a Recommended Continuous Gaze Location Based Upon the Estimated Future Position and the Driver Registration Input |

TABLE 1-continued

| BLOCK | BLOCK CONTENTS |
| --- | --- |
| 550 | Display the Registered Graphic Upon a Head-Up Display |

Process 500 begins in block 510, wherein sensors or devices providing details of an operating environment of the vehicle are monitored. In block 520, an estimated future position of the vehicle is determined based upon the monitored sensors or devices. In block 530, a driver registration input indicating an eye location for the operator of the vehicle is monitored. In block 540, a registered graphic including a recommended continuous gaze location is determined according to disclosed methods based upon the estimated future position and the driver registration input. At block 550, the registered graphic is projected upon the HUD. A number of embodiments for processes to determine a recommended continuous gaze location are envisioned, and the disclosure is not intended to be limited to the particular exemplary embodiments disclosed.

The driver registration input can include or can be used to determine an operator gaze location or an estimate of a location upon the HUD that the operator is looking. Proper viewing of rearview mirrors can be an important component to driver training. In one embodiment, the operator gaze location can be monitored and a mirror gaze occurrence can be determined to indicate how frequently the operator is looking at the rearview mirror. If the mirror gaze occurrence indicates that the operator is not paying sufficient attention to the rearview mirror, then the registered graphic including the recommended continuous gaze location can be adjusted to recommend that that driver gaze at the rearview mirror. Adjusting the graphic in this way can include moving a location of the graphic toward the mirror, changing the registered graphic to include an iconic representation of the mirror or the word "mirror", or displaying attendant graphics upon the display to attract operator attention to the mirror.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. System to display a persistent registered graphic within a source vehicle, comprising:
a substantially transparent windscreen head-up display; and
a control module
monitoring a previously input professionally recommended gaze location for straight lane road geometry comprising a recommended projected straight lane gaze distance in front of the vehicle;
monitoring a previously input professionally recommended gaze location for curved lane road geometry comprising a recommended projected curved lane gaze distance in front of the vehicle;
monitoring a road geometry of the road surface in front of the vehicle;
projecting the persistent, continuously displayed registered training aid graphic upon the head-up display, the persistent, continuously displayed registered training aid graphic configured to indicate a continuous recommended gaze location point upon the road surface at a specific focal point, at least a minimum distance in front of the vehicle, upon which a vehicle operator gaze may be focused to achieve a desired operation of the vehicle, wherein the continuous recommended gaze location point is determined, when the monitored road geometry comprises straight lane road geometry, based upon the professionally recommended gaze location for straight lane road geometry and a center of a current lane of travel, and when the monitored road geometry comprises curved lane road geometry, based upon the professionally recommended gaze location for curved lane road geometry and a lane marker located on an inside of the curved lane road geometry.

2. Method to display a persistent, continuously displayed registered training aid graphic upon a substantially transparent windscreen head-up display within a source vehicle, the method comprising:

inputting a professionally recommended gaze location for straight lane road geometry comprising a recommended projected straight lane gaze distance in front of the vehicle;

inputting a professionally recommended gaze location for curved lane road geometry comprising a recommended projected curved lane gaze distance in front of the vehicle;

monitoring a road geometry of the road surface in front of the vehicle;

projecting the persistent, continuously displayed registered training aid graphic upon the head-up display, the persistent, continuously displayed registered training aid graphic configured to indicate a continuous recommended gaze location point upon the road surface at a specific focal point, at least a minimum distance in front of the vehicle, upon which a vehicle operator gaze may be focused to achieve a desired operation of the vehicle, wherein the continuous recommended gaze location point is determined, when the monitored road geometry comprises straight lane road geometry, based upon the professionally recommended gaze location for straight lane road geometry and a center of a current lane of travel, and when the monitored road geometry comprises curved lane road geometry, based upon the professionally recommended gaze location for curved lane road geometry and a lane marker located on an inside of the curved lane road geometry.

3. The method of claim 2, further comprising monitoring a location of a target vehicle being passed; and wherein the recommended continuous gaze location point is determined further based upon the location of the target vehicle being passed.

4. The method of claim 2, further comprising monitoring a visible feature in the operating environment selected from the group consisting of a pavement crack in a roadway in front of the source vehicle, a target vehicle in front of the source vehicle, a sign, traffic instructions painted upon the roadway, a tree, a traffic barrier lining the roadway, and fence along the roadway; and wherein the recommended continuous gaze location point is determined further based upon the visible feature.

5. The method of claim 2, further comprising determining a newly detected object requiring immediate attention;

suspending projecting the persistent, continuously displayed registered training aid graphic based upon the newly detected object requiring immediate attention.

6. The method of claim 2, wherein the source vehicle is a racing vehicle.

7. The method of claim 6, further comprising:

determining a braking point for the monitored road geometry;

determining a turn in point for the monitored road geometry;

determining an apex for the monitored road geometry; and determining a turn out point for the monitored road geometry;

wherein the recommend gaze location point is further based upon the braking point, the turn in point, the apex, and the turn out point.

8. The method of claim 7, wherein the persistent, continuously displayed registered training aid graphic changes based upon the source vehicle approaching the braking point; and wherein the persistent, continuously displayed registered training aid graphic changes based upon the source vehicle approaching the apex.

* * * * *